L. W. MERKEL.
MOVING PICTURE MACHINE.
APPLICATION FILED JULY 21, 1910.
1,026,991.
Patented May 21, 1912.
7 SHEETS—SHEET 3.
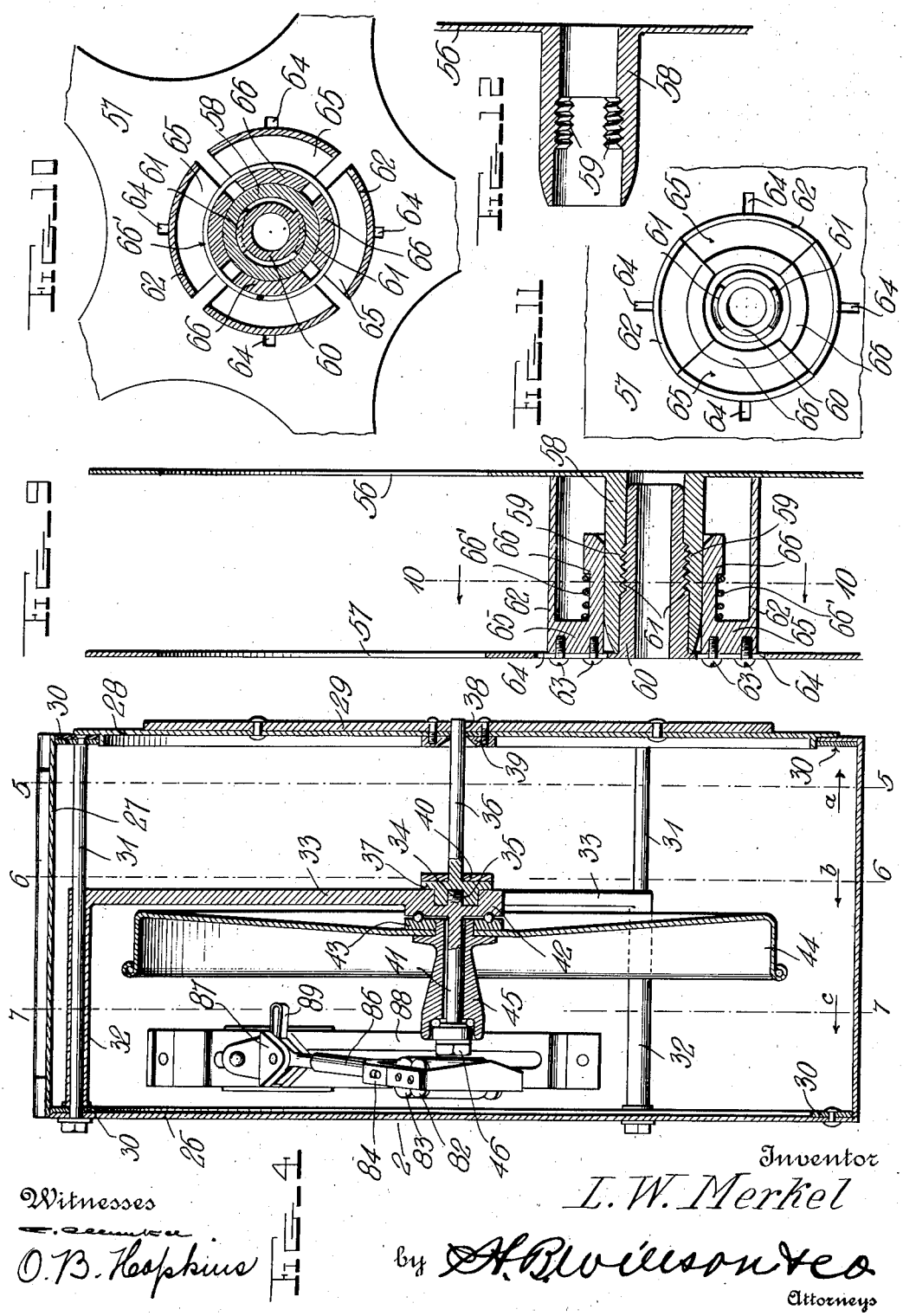
Witnesses
O. B. Hopkins
Inventor
L. W. Merkel
by H. B. Willson & Co.
Attorneys

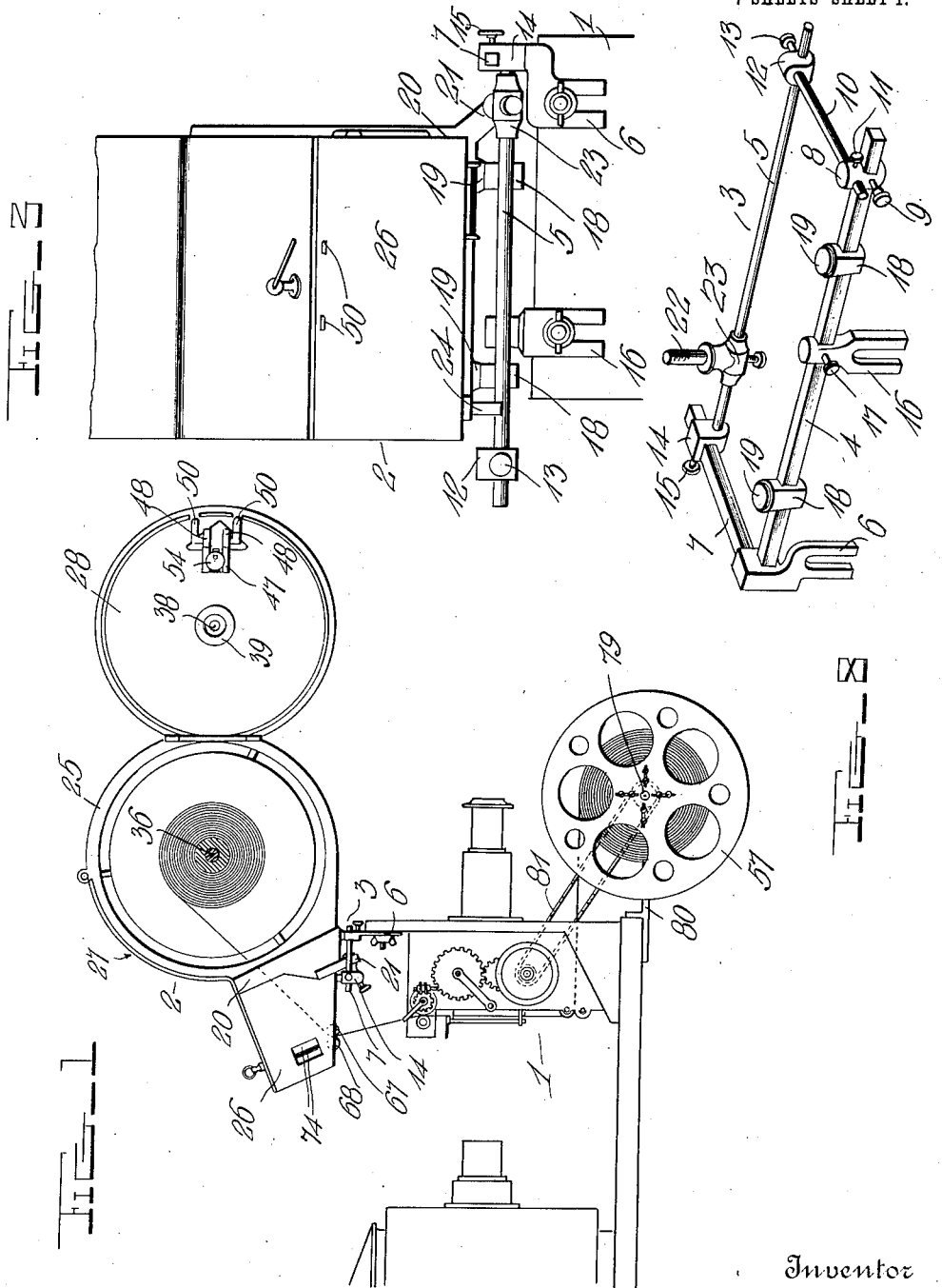

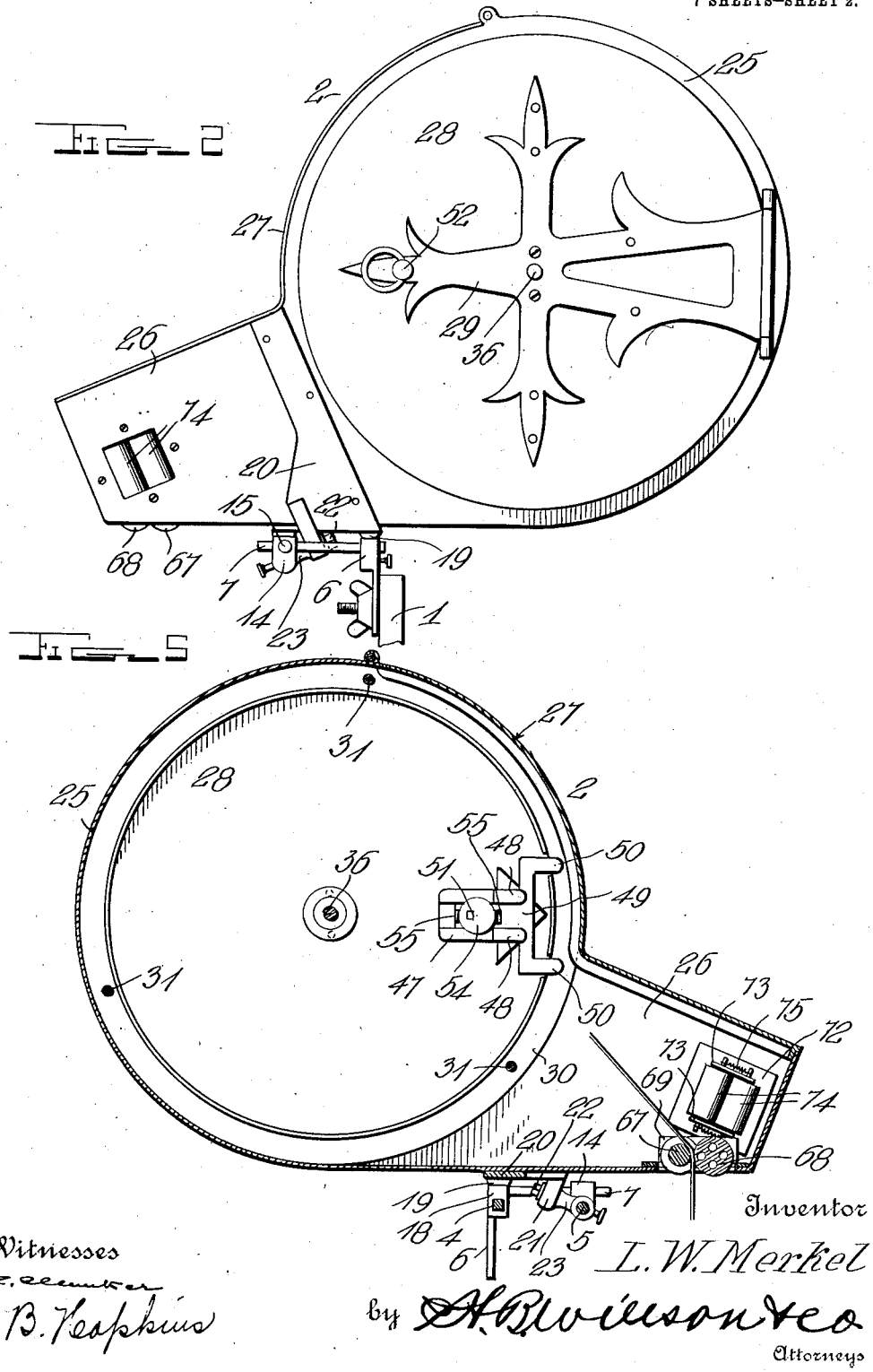

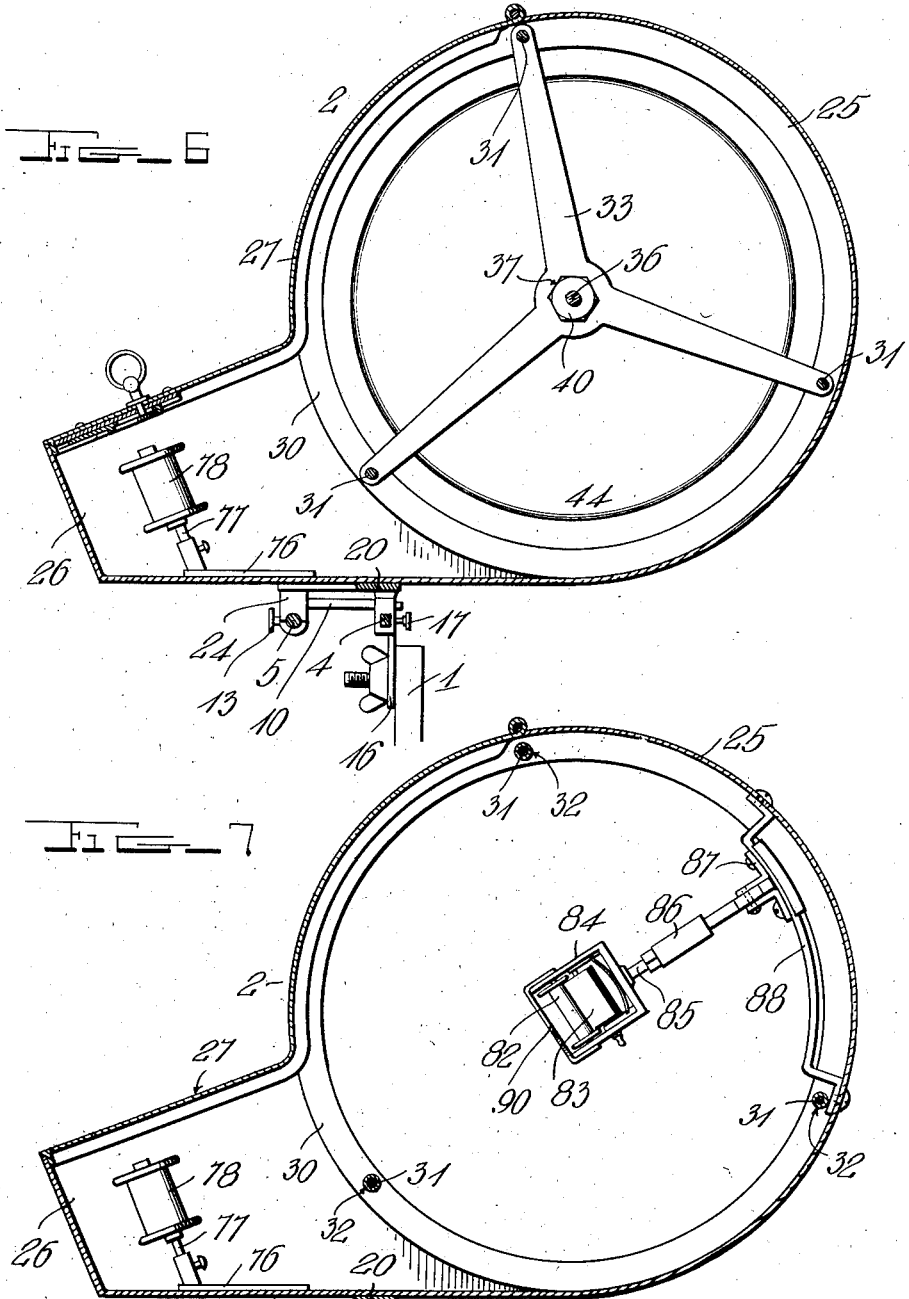

L. W. MERKEL.
MOVING PICTURE MACHINE.
APPLICATION FILED JULY 21, 1910.
1,026,991.
Patented May 21, 1912.
7 SHEETS—SHEET 5.
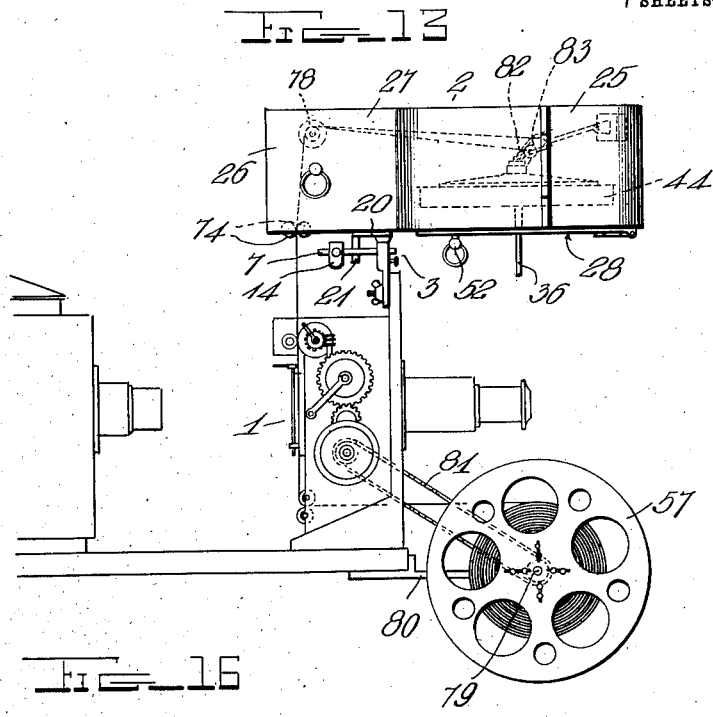
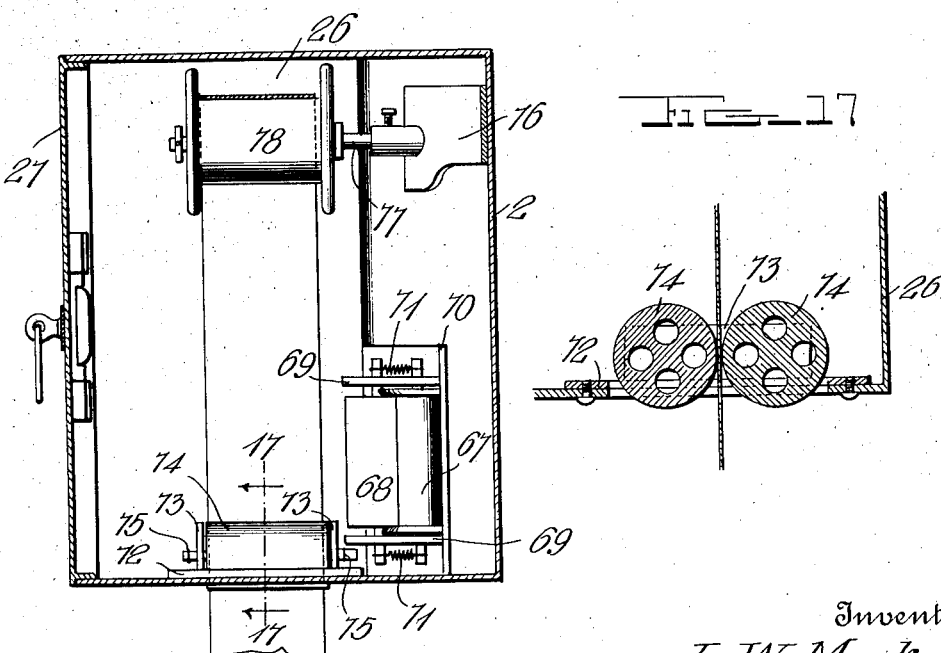
Witnesses
Inventor
L. W. Merkel
by
Attorneys

L. W. MERKEL.
MOVING PICTURE MACHINE.
APPLICATION FILED JULY 21, 1910.

1,026,991.

Patented May 21, 1912.

7 SHEETS—SHEET 6.

Witnesses
O. B. Hopkins

Inventor
L. W. Merkel
by H. B. Willson & Co.
Attorneys

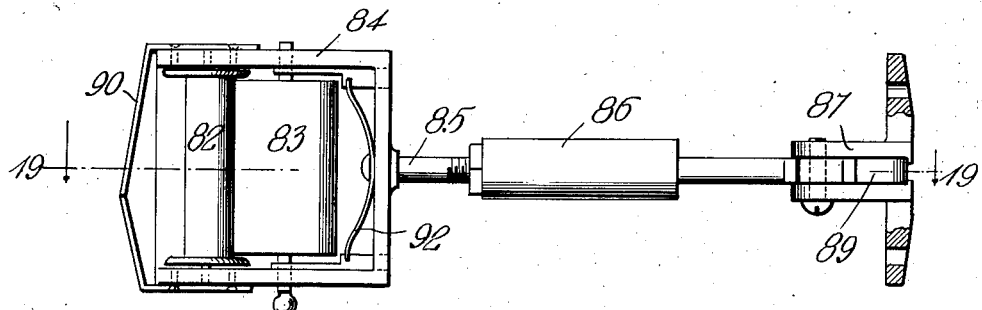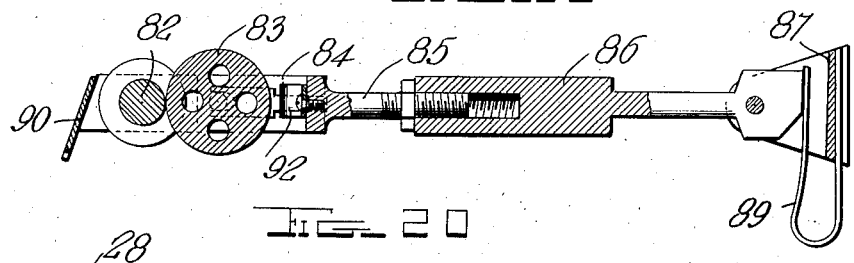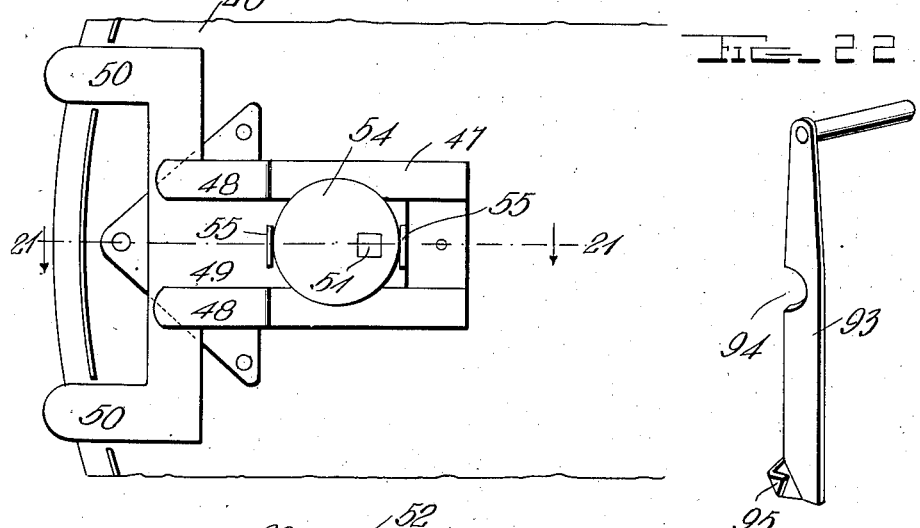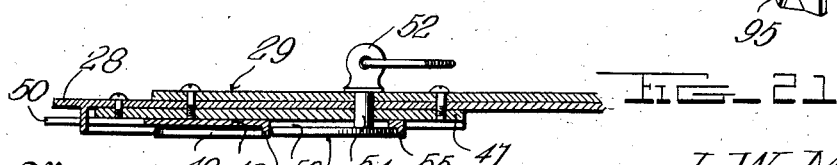

UNITED STATES PATENT OFFICE.

LEWIS W. MERKEL, OF ALLENTOWN, PENNSYLVANIA, ASSIGNOR OF ONE-FOURTH TO JOHN J. HANLON AND ONE-FOURTH TO H. G. SCHELDEN, BOTH OF ALLENTOWN, PENNSYLVANIA.

MOVING-PICTURE MACHINE.

1,026,991.          Specification of Letters Patent.     Patented May 21, 1912.

Application filed July 21, 1910. Serial No. 573,056.

*To all whom it may concern:*

Be it known that I, LEWIS W. MERKEL, a citizen of the United States, residing at Allentown, in the county of Lehigh and State of Pennsylvania, have invented certain new and useful Improvements in Moving-Picture Machines; and I do declare the following to be a full, clear, and exact description of the invention, such as will enable others skilled in the art to which it appertains to make and use the same.

This invention relates to improvements in moving picture machines and particularly to the film holding and winding mechanism thereof.

One object of the invention is to provide a machine of this character having an improved construction of reel upon which the film is wound as it is being used and from which the film may be removed without unwinding.

Another object is to provide means whereby the coil or film removed from the reel may be supported in position to be again run through the machine without the necessity of winding the film back on the reel.

With the foregoing and other objects in view, the invention consists of certain novel features of construction, combination and arrangement of parts as will be more fully described and particularly pointed out in the appended claims.

Figure 14:
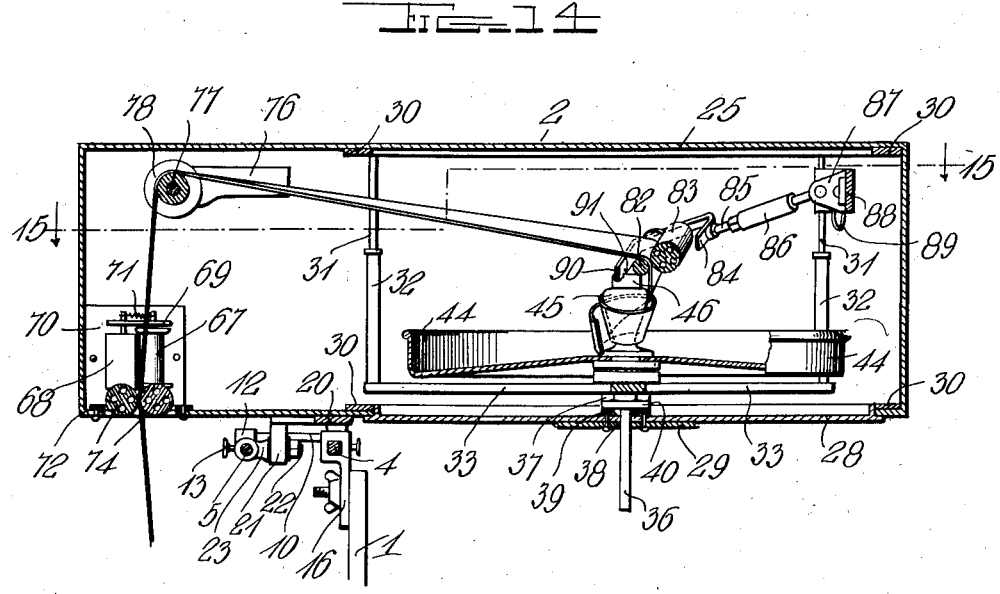
Figure 15:
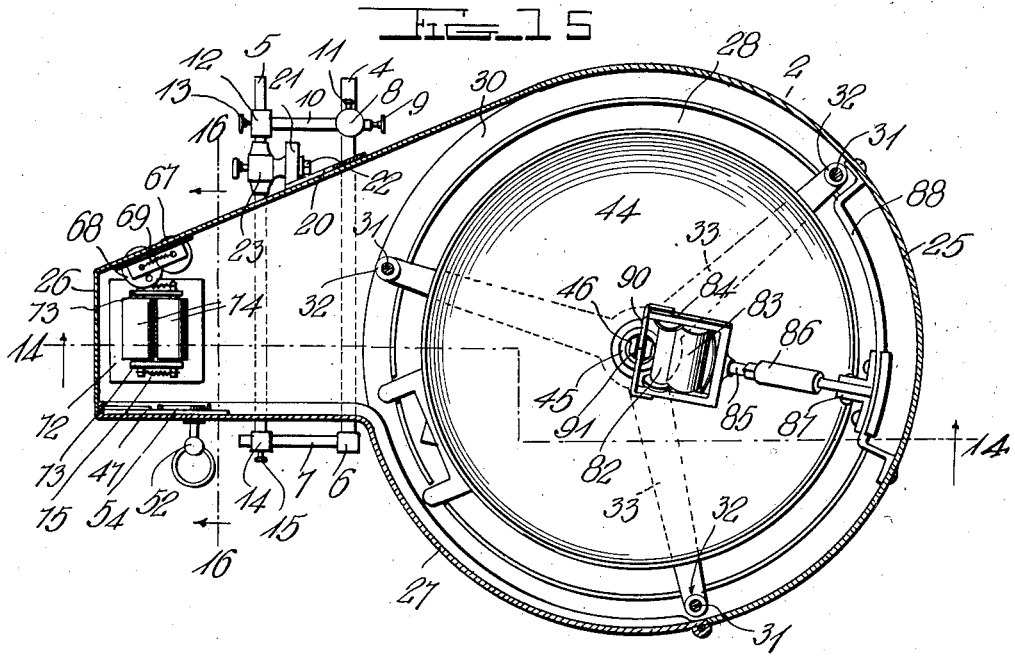

In the accompanying drawings: Figure 1 is a diagrammatic side view of a moving picture machine embodying my invention showing the door open; Fig. 2 is an enlarged side view of the reel holding box; Fig. 3 is a front end view of a portion of the reel box; Fig. 4 is a central vertical transverse sectional view taken on a line with the reel shaft; Fig. 5 is a vertical longitudinal sectional view on the line 5—5 of Fig. 4 looking in the direction of the arrow *a*. Fig. 6 is a similar view on the line 6—6 looking in the direction of the arrow *b*; Fig. 7 is a similar view on the line 7—7 of Fig. 4 looking in the direction of the arrow *c*; Fig. 8 is a detail perspective view of the supporting bracket for the reel box; Fig. 9 is an enlarged vertical section through a portion of the reel removed from the box; Fig. 10 is a transverse sectional view taken on the line 10—10 of Fig. 9; Fig. 11 is a view of the inner side of one section of the reel showing the position of the clamping members of the hub before the adjoining section of the reel is engaged therewith; Fig. 12 is a fragmentary vertical section through the hub portion of the adjoining member of the hub; Fig. 13 is a diagrammatic view of the machine when arranged for use without a reel in the reel box; Fig. 14 is an enlarged vertical section of the reel box showing the manner in which the same is used when arranged in a horizontal position and taken on the line 14—14 of Fig. 15; Fig. 15 is a horizontal sectional view on the line 15—15 of Fig. 14; Fig. 16 is a detail vertical section of the same on the line 16—16 of Fig. 15; Fig. 17 is a detail sectional view taken on the line 17—17 of Fig. 16; Fig. 18 is a front elevation partly in section of the film guiding rolls; Fig. 19 is a horizontal section taken on the line 19—19 of Fig. 18; Fig. 20 is a side elevation of the lock employed for fastening the doors of the box; Fig. 21 is a horizontal section on the line 21—21 of Fig. 20; Fig. 22 is a detail perspective view of the crank handle for revolving a reel in the reel box of the machine.

Referring more particularly to the drawings, 1 denotes the lamp and lens box of the machine. The box 1 may be of the usual or any suitable construction and is provided with any suitable form of film operating mechanism. Arranged above the box 1 is my improved reel holding box 2. The box 2 is attached to the lamp box 1 by a supporting bracket 3 which as here shown preferably comprises a pair of parallel bars 4 and 5. The bar 4 is preferably rectangular in cross section and has formed integral with one end a slotted bracket plate 6 on which is formed a right angular laterally projecting end bar 7. On the opposite end of the bar 4 is slidably mounted a head 8, said head being held in its adjusted positions on the bar 4 by a set screw 9. With the head 8 is slidably engaged the opposite end bar 10, said bar being secured in its adjusted positions in the head 8 by a set screw 11. On the opposite end of the end bar 10 is fixedly mounted a head 12 which has a sliding engagement with the adjacent end of the bar 5 of the bracket. The head 12 is fastened in its adjusted positions on the bar 5 by a set screw 13. On the opposite end of the bar 5 i formed an integral head 14 with which is slidably engaged the adjacent end of the end bar 7. The bar 5 is fastened in its adjusted position on the end bar 7 by a set screw 15.

The box 2 is provided with a right angular bracing plate 20 on which, at one corner thereof is formed an apertured ear 21 adapted to receive a stud bolt 22 formed on a head 23 which is slidably engaged with the bar 5 of the bracket and which is held in its adjusted positions on said bar by a set screw or other fastening device. The box 2 is further supported on the bar 5 by a notched lug 24 formed on a lateral extension of the corner brace 20 of the box. By thus forming the box supporting bracket 3 the latter may be adjusted in all directions and the bracket plates also adjusted thereby providing for the attachment of the box 2 to any form or size of lamp box. By pivotally and slidably attaching the box 2 to the bracket in the manner described, said box may be shifted and turned from a vertical to a horizontal position and vice versa.

The box 2 is preferably constructed of sheet metal and preferably comprises a cylindrical body portion or drum 25 having on one edge and adjacent to its lower portion a substantially rectangular extension 26. A portion of one edge of the drum 25 and the upper edge of the extension 26 is provided with a hinged cover 27 whereby access may be had to this part of the box. One side of the drum 25 is left open and is adapted to be closed by a door 28, the hinge 29 of which is arranged to form a brace for the door and also a bearing bracket for the end of the reel shaft hereinafter described.

Arranged on the opposite inner sides of the box 2 adjacent to the outer edges thereof are reinforcing rings 30 in which are secured a series of transversely disposed guide rollers 31 with which are slidably engaged bearing sleeves 32 formed on or rigidly secured to the outer ends of a shaft supporting spider 33 arranged in the drum 25 as shown. By thus supporting the spider 33 the latter may be shifted back and forth across the drum for a purpose hereinafter described. Formed integral with the center of the spider 33 on the side of the same adjacent to the door 28 is a laterally projecting stud shaft 34 around which in the side of the spider is formed an annular recess 35. On the stud shaft 34 is screwed a detachable reel supporting shaft 36, said shaft being provided near its inner end with an enlarged head 37 having a squared wrench engaging portion and provided in its inner end with a threaded socket to receive the stud shaft 34 whereby said reel shaft 36 is detachably secured to the spider. The outer end of the shaft 36 is slidably engaged with a bearing aperture 38 formed in the door 28 and bracing hinge 29. On the inner side of the door is preferably arranged a fiber washer 39, while on the shaft 36 adjacent to the enlarged or headed end thereof is arranged a fiber washer 40. The film reel is adapted to revolve on the shaft 36 between the washers 39 and 40 which latter are provided for the purpose of taking up wear and causing the reel to revolve true.

On the opposite side of the spider from the stud shaft 34 is formed a laterally projecting trap supporting shaft 41 around the inner end of which, on the spider, is formed one member 42 of an annular ball race, the opposite member 43 of which is arranged on the lower or outer side of a film supporting tray 44 which is revolubly mounted on the shaft 41 and has a ball bearing engagement with the spider by means of the ball races 42 and 43 and a series of balls arranged therein as shown. The bottom of the tray is elevated in the center and inclines gradually toward the edges of the tray and to the elevated center of said bottom is secured a film holding cone 45, said cone having a revolving engagement with the shaft 41 which projects through the center of the cone and is provided on its outer end with a cone and tray fastening nut 46 between which and the adjacent end of the cone is arranged a ball bearing. By means of the ball bearing at the end of the cone and between the trap and the spider practically all friction between these parts is prevented thus permitting said tray and cone to freely revolve on the shaft 41. The outer end of the cone 45 is preferably rounded to prevent scratching the film when unwound therefrom.

In order to hold the doors 27 and 28 in a closed position, I preferably employ on each door an improved form of lock comprising a guide or base plate 47 which is riveted or otherwise secured to the inner side of the door and has slidably engaged therewith and, with guide lugs 48 formed thereon, a locking bolt 49. The bolt 49 is preferably provided on its outer end with a pair of locking lugs 50 which are adapted to be projected into engagement with the inner side of the box or with suitable keeper slots formed therein. The bolt 49 is projected into and out of operative position by means of an operating shaft 51 which is revolubly mounted in the base plate 47 and projects through the door and has on its outer end an operating head which is here shown and is preferably in the form of a knob 52 having therein a ring which serves as a handle for opening and closing the doors. The inner end of the shaft 51 projects through a guide slot 53 formed in the inner end of the bolt 49 and has fixedly secured to its inner end a cam bolt operating disk 54 which is adapted to be turned between operating lugs 55 formed on the bolt 49 whereby when said disk is turned in one direction the bolt will be retracted to an unlocked position and when turned in the opposite direction the bolt will be projected to a locked position thereby fastening the doors.

In connection with the machine, I employ an improved construction of film support- ing reel comprising a pair of circular side plates 56 and 57 which are detachably con- nected together by a hub formed in sepa- rable parts which telescope and lock to- gether in a manner to be now described. The outer telescoping member of the hub is secured to the side plate 56 and comprises a cylindrical tube 58 having a slightly re- duced or tapered outer end which is pro- vided at diametrically opposite points on its inner surface with a series of locking teeth 59. The inner telescoping member of the hub comprises a cylindrical tube 60 which is rigidly secured at one end to the side plate 57 and is provided at diametrically opposite points on its outer surface with a series of segmental locking teeth 61. When the side plates are brought together to form the reel, the inner member 60 of the hub is inserted in the tapered outer member 58 with the segmental teeth of the member 60 engaging the spaces between the teeth 59 of the member 58, after which the side plates 56 and 57 are given a turn in opposite direc- tions thereby bringing said teeth 59 and 61 into interlocking engagement thereby hold- ing the two side plates of the reel together.

The interlocking members 58 and 60 of the hub have arranged around the same a film holding sleeve 62 which is preferably formed of a series of segmental sections which are arranged around the hub member 60 and are adjustably secured at one end to the inner side of the side plate 57 of the reel by means of set screws 63 which are insert- ed through radially disposed slots 64 formed in the plate 57 and are screwed into the inner ends of the segmental sections of the sleeve 62 thereby adjustably securing said sections to the plate 57. On one end of the sections of the sleeve 62 are formed in- wardly projecting segmental lugs 65 on the inner ends of which are formed right angu- larly projecting segmental flanges 66 which are disposed parallel with and spaced a suitable distance from the segmental mem- bers of the sleeve 62. The segmental flanges 66 thus form a substantially cylindrical socket which surrounds the outer tubular member 58 of the hub. The flanges 66 are held in yielding engagement with the mem- ber 58 of the hub by a coiled spring 66' arranged around said flanges as shown. When the telescoping members of the hub are engaged to form the reel, the segmental sections of the sleeve 62 will be forced a slight distance apart thus forming between said sections narrow slots with which the end of the film is engaged when wound upon said sleeve. By thus forming the reel, the sides of the same may be readily sepa- rated thus permitting the removal of the film from the reel without the necessity of unwinding the film.

In the lower edge of the extension 26 of the box 2 opposite to the door 27 is revolubly mounted a pair of film guiding rollers 67 and 68, said rollers being revolubly mounted in bearing flanges 69 formed on an attach- ing plate 70 in which is formed a hole cor- responding to a similar hole in the edge of the box to which the attaching plate is secured. The roller 67 is preferably pro- vided on its outer ends with radial flanges between which the roller 68 revolves. The ends of the shaft of the roller 68 project through and are revolubly mounted in slots formed in the flanges 69, and the projecting ends of the roller shafts are connected to- gether by coiled springs 71 whereby said roller 68 is held in yielding engagement with the roller 67. In the front side of the extension 26 is formed an aperture over which is arranged a roller attaching plate 72 having formed thereon roller bearing flanges 73 between which are revolubly mounted a pair of film guiding rollers 74. The bearing apertures for the shaft of one of said rollers are slightly elongated and the projecting ends of the roller shafts are con- nected together by coiled springs 75 which hold said rollers in yielding engagement. The guide rollers 67, 68 and 74 are prefer- ably provided with a series of longitudinal bores or passages whereby said rollers are lightened.

Arranged in the extension 26 of the box and secured to the edge of the same opposite to the guide rollers 74 is a roller attaching bracket 76 with which is detachably secured the inner end of a roller shaft 77 on which is revolubly mounted a flanged film guid- ing roller 78 which is preferably formed of wood and is provided for a purpose here- inafter described.

When the machine is used in the ordinary manner the ordinary reel of film or my im- proved reel containing a film is engaged with the film supporting shaft 36 and the film passed from said reel through the guide rollers 67, 68 and thence through the lamp and lens box to one of my improved reels with which the end of the film is connected in the manner described. My improved reel when thus employed for receiving the film is revolubly mounted on a suitable supporting shaft 79 in a reel supporting frame 80 ar- ranged below the lamp box as shown. The shaft 79 is driven to revolve the reel by means of any suitable driving mechanism and is here shown as being operatively connected by a sprocket gearing 81 to the film shifting mechanism in the lamp box. After the film has thus been run off from the reel in the box onto my improved reel in the frame 80 said film may be removed from my improved reel without unwinding the film and for the purpose of exhibiting the same again in the manner now to be described. In removing the film from my improved reel, the side members of the reel are separated by the disengagement of the toothed members of the hub as has been previously described. After the sides of the reel have thus been separated, the film may be slipped off the sleeve 62 while in coiled form and is then in readiness to be engaged with the film holding cone 45 and film supporting tray 44. Before the film is engaged with the cone and tray, the empty reel is removed from the shaft 36 and the spider 33 together with the tray 44 and cone 45 shifted laterally in the box on the guide rods 31 and toward the door 28. In this movement of the spider and the parts carried thereby, the shaft 36 will be projected through the opening 38 in the door and hinge 29. By thus shifting the tray an increased space will be provided between the opposite side of the tray and the side of the box. After the parts have thus been shifted, the box is swung over on the bracket 3 to a substantially horizontal position and is shifted laterally on the rod 5 of the bracket to bring the box in line with the bracket. When in this position, the film is slipped into engagement with the cone 45 and rests upon the tray 44 and the inner end of the film is passed between a pair of film guiding rollers 82 and 83 which are revolubly mounted in a bearing frame 84 which is provided with a stem 85 having a screw threaded engagement with a threaded socket formed in the end of a supporting arm 86 the inner end of which is pivotally connected to a supporting bracket 87. The bracket 87 has a sliding engagement with a curved longitudinally slotted supporting bar 88 which is secured to the inner side of the box as shown. By thus attaching the inner end of the arm 86 said arm and the guide rollers may be shifted to different positions in the box. The inner end of the arm 86 is provided with a squared head between which and the outer side of the bracket is arranged a flat spring 89 the pressure of which is applied to the head to hold the rollers in an elevated position against the side of the box when said rollers are not in use. On the outer end of the frame 84 is secured a plate 90 having its lower edge inclined in opposite directions and said plate, when the frame 84 and arm 86 are swung down to bring the rollers to an operative position, has its lower edge engaged with a slot 91 formed in the nut 46 on the end of the shaft 41 upon which the cone 45 and tray 44 are mounted. When the edge of the plate 90 is thus engaged with the slot in the nut 46, the frame 84 and guide rollers 82, 83 will be held in an inclined position to receive the film, the inner end of which is passed up between the rollers 82 and 83 from which it is passed around the guide roller 78 and then down between the guide rollers 74 whence it extends through the lamp and lens box and is wound upon a reel in the lower reel supporting frame. By thus supporting and arranging the film it may be seen that the same may be fed through the machine in the proper direction without the necessity of rewinding the film on the reel. In the drawings the guide rollers 82 and 83 and their supporting mechanism are arranged for feeding the film to the right and in order to feed the film to the left the bracket 87 is shifted around on the slotted guide plate 88 to the opposite end thereof and the roller supporting frame 84 is tilted in the opposite direction and has the opposite inclined edge of the plate 90 in engagement with the slot in the nut 46 whereby the frame is supported in this latter position. By providing the threaded connection between the stem 85 of the frame 84 and the supporting arm 86 these parts may be adjusted to operate in boxes of different sizes. The rollers 82 and 83 in the frame 84 are constructed and arranged in the same manner as the guide rollers 67 and 68 except that the rollers 82 and 83 are held in yielding engagement by a flat spring 92 arranged in the frame as shown. After the film has thus been run through the machine from the cone and tray, the spider 33 may be shifted and the tray and cone thereby pushed back to the opposite side of the box which will then be returned to its vertical position to permit a fresh reel to be applied to the shaft 36 and the film unwound therefrom in the usual manner. If it should be desired to rewind a film on a reel, the latter may be placed upon the shaft 36 and the end of the film engaged therewith after which a suitable reel operating device may be applied to the reel and the latter rotated. For thus rotating the reel, I preferably employ a crank handle 93 which consists of a flat plate or bar having formed in one edge thereof a notch 94 adapted to be revolubly engaged with the end of the shaft 36 and which has formed on one end a diagonally arranged hook 95 which is adapted to be hooked into one of the openings in the side of the reel thereby operatively engaging the crank handle with the reel to revolve the same on said shaft and wind the film on the reel.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:

1. In a moving picture machine, the combination of a reel supporting box, an adjustable supporting frame whereby said box is attached to the machine, means to pivotally connect said box with the frame whereby the box may be turned and supported by the frame either in a vertical or horizontal position, means in said box to operatively support a reel, and means in the box to operatively support a roll of film and permit the same to be unwound from its center.

2. In a moving picture machine, the combination of a reel supporting box, means whereby said box is supported on the machine in a vertical or a horizontal position, a reel supporting shaft slidably mounted in said box, a reel adapted to be engaged with said shaft, and means to operatively support a roll of film in said box and permit the same to unwind from its center.

3. In a moving picture machine, the combination of a reel supporting box, an adjustable supporting frame adapted to support said box in a vertical or horizontal position, doors arranged in said box whereby access may be had thereto, a shaft supporting spider slidably mounted in said box, a reel supporting shaft detachably connected with said spider, a reel supporting tray revolubly mounted on said spider, a reel holding cone carried by said tray, and pairs of guide rollers arranged in said box whereby the film is guided when unwound from said cone.

4. In a moving picture machine, the combination of a reel supporting box, a series of guide rods arranged therein, a spider slidably mounted on said rods, a reel supporting shaft detachably secured to said spider, a reel adapted to be revolubly mounted on said shaft, a film supporting tray revolubly mounted on said spider, said tray having a bottom inclined from its center toward its outer edges, a film holding cone carried by said tray, a pair of adjustably and yieldably mounted film guiding rollers adapted to be swung into and out of operative position to receive the film from said cone, and guide rollers revolubly mounted in said box whereby the film is guided therethrough when fed through the machine.

5. In a moving picture machine, the combination of a box, a supporting frame therefor, means to pivotally secure the box to said frame whereby the box may be supported in either a vertical or horizontal position, and means within the box to support a roll of film.

6. In a moving picture machine, the combination of a lens box, a frame secured thereto and comprising parallel side bars, parallel end bars, means for effecting relative adjustment of the side and end bars, a film containing box, a bracing plate at one corner of the box, and a pivotal connection between said plate and a side bar of the frame.

7. In a moving picture machine, the combination of a lens box, a frame secured thereto and comprising parallel side bars, parallel end bars, means for effecting relative adjustment of the side and end bars, a film containing box, a bracing plate at one corner of the box, a pivotal connection between said plate and a side bar of the frame, and rests on the other side bar upon which the box may bear.

8. In a moving picture machine, the combination of a lens box, a frame secured thereto and comprising parallel side bars, parallel end bars, means for effecting relative adjustment of the side and end bars, a film containing box, a brace plate at one corner of the box, and an adjustable pivotal connection between said plate and the side of the frame.

9. In a moving picture machine, the combination of a lens box, a frame secured thereto comprising parallel side bars, an end bar formed integrally with one side bar, a collar adjustably secured on said end bar and carrying one end of the other side bar, collars adjustably secured on the side bars, a second end bar carried by said collars, a head adjustably secured on one of the side bars, a film containing box, and a pivotal connection between said box and said head.

10. In a moving picture machine, the combination of a reel supporting box, an adjustable supporting frame adapted to support said box in a vertical or a horizontal position, a shaft supporting spider slidably mounted in said box, a reel supporting shaft adjustably connected with said spider, a reel supporting tray revolubly mounted on said spider, and a reel holding cone carried by said tray.

11. In a moving picture machine, the combination of a reel supporting box, a film supporting tray rotatably mounted in said box, and a film holding cone disposed at the center of the tray.

12. In a moving picture machine, the combination of a reel supporting box, a film supporting tray rotatably mounted therein and having a conical bottom, and a film holding cone secured to said bottom at the apex thereof.

13. In a moving picture machine, the combination of a reel supporting box, a film supporting tray rotatably mounted in said box, a film holding cone disposed at the center of the tray, a frame mounted within the box, and film guiding rollers on said frame adjacent the end of the cone.

14. In a moving picture machine, the combination of a reel supporting box, a film supporting tray rotatably mounted in said box, a film holding cone disposed at the center of the tray, a frame mounted within the box and movable circumferentially thereof, and film guiding rollers in said frame adjacent the end of the cone.

15. In a moving picture machine, the combination of a reel supporting box, a film supporting tray rotatably mounted in said box, a film holding cone disposed at the center of the tray, a curved support arranged concentrically with the tray, a frame mounted on said support and adjustable along the same, and film guiding rollers carried by said frame adjacent the outer end of the cone.

16. In a moving picture machine, the combination of a reel supporting box, a film supporting tray rotatably mounted in said box, a film holding cone disposed at the center of the tray, a curved support within the box concentric with the tray, a bracket engaging said support and adjustable longitudinally thereof, a frame pivoted to said bracket, and film guiding rollers at the inner end of said frame adjacent the cone.

17. In a moving picture machine, the combination of a reel supporting box, a film supporting tray rotatably mounted in said box, a film holding cone disposed at the center of the tray, a curved support within the box concentric with the tray, a bracket engaging said support and adjustable longitudinally thereof, an extensible frame pivoted to said bracket, and film guiding rollers at the inner end of said frame adjacent the cone.

18. In a moving picture machine, the combination of a reel supporting box, a shaft therein, a film holding tray rotatably mounted on said shaft, a nut on the end of said shaft to retain the tray thereon having a notch in its outer side, a frame mounted adjustably within the box, a cross bar at the end of said frame having inclined edges to engage the notch in the nut, and film guiding rollers carried by said frame.

In testimony whereof I have hereunto set my hand in presence of two subscribing witnesses.

LEWIS W. MERKEL.

Witnesses:
JOHN J. HANLON,
PERCY SCHAADT.